United States Patent [19]

Nomura et al.

[11] Patent Number: 5,097,349

[45] Date of Patent: Mar. 17, 1992

[54] METHOD OF RECORDING AND REPRODUCING PICTURE INFORMATION, RECORDING MEDIUM, AND RECORDING MEDIUM PLAYING APPARATUS

[75] Inventors: Satoru Nomura; Yoshihisa Nagai; Tetsuro Emi, all of Yamanashi, Japan

[73] Assignees: Pioneer Electronic Corporation, Tokyo; Pioneer Video Corporation, Yamanashi, both of Japan

[21] Appl. No.: 247,281

[22] Filed: Sep. 21, 1988

[30] Foreign Application Priority Data

Feb. 29, 1988 [JP] Japan .................................. 63-46603

[51] Int. Cl.⁵ .............................................. H04N 5/76
[52] U.S. Cl. ...................................... 358/335; 358/342; 369/48
[58] Field of Search ........................... 360/14.1-14.3, 360/32, 33.1, 40, 48; 369/32, 44.28, 48-50, 54, 58, 124, 275.3; 358/335, 342, 183, 185, 903; 371/69.1; 340/723

[56] References Cited

U.S. PATENT DOCUMENTS

| | | | |
|---|---|---|---|
| 4,697,176 | 9/1987 | Kawakami | 340/723 |
| 4,709,277 | 11/1987 | Ninomiya et al. | 360/33.1 X |
| 4,729,043 | 3/1988 | Worth | 369/32 X |
| 4,777,539 | 10/1988 | Nomura et al. | 360/14.2 X |
| 4,852,105 | 7/1989 | Kurz | 371/69.1 |
| 4,860,272 | 8/1989 | Nishikawa et al. | 369/111 X |
| 4,885,644 | 12/1989 | Ishii et al. | 369/50 X |
| 4,899,233 | 2/1990 | Yoshida | 360/77.13 X |
| 4,914,527 | 4/1990 | Asai et al. | 358/343 X |
| 4,942,551 | 7/1990 | Klappert et al. | 360/32 X |

Primary Examiner—Roy N. Envall, Jr.
Assistant Examiner—W. R. Young
Attorney, Agent, or Firm—Wegner, Cantor, Mueller & Player

[57] ABSTRACT

Method of recording and reproducing picture information and a recording medium on which the picture information is recorded by the method, and an apparatus for playing such a recording medium. In addition to video format signal and a coded information signal, graphic codes including picture information and instruction codes representing a mixing ratio on each position of a two-dimensional picture formed by the video format signal are recorded on the recording medium after being inserted as a subcode of the coded information signal. At the time of reproduction, signals according to the graphic codes are mixed at each position of the video format signal in accordance with the instruction codes. Preferably, in graphic codes are preferably codes representing the color of each position of the two-dimensional picture, and the instruction codes are codes respectively representing mixing ratios previously determined in accordance with colors represented by the graphics codes.

6 Claims, 14 Drawing Sheets

Fig. 4

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig. 5

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | \multicolumn{6}{c}{PARITY Q} |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | | | | | | |
| 19 | 0 | 0 | 0 | 0 | 0 | 0 |
| 20 | \multicolumn{6}{c}{PARITY P} |
| ⋮ | | | | | | |
| 23 | | | | | | |

Fig. 6

| TCB | | MODE | SUBCODE PICTURE | MOTION PICTURE |
|---|---|---|---|---|
| 0 | 0 | TRANSPARENT MODE | 0 % | 100 % |
| 1 | 0 | MIXING MODE | M % | (100-M) % |
| 1 | 1 | NON-TRANSPARENT MODE | 100 % | 0 % |

Fig. 7

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | PARITY Q ||||||
| 3 | |||||| |
| 4 | COLOR 0 |||||| 
| 5 | |||||| |
| 6 | : |||||| |
| 17 | : |||||| |
| 18 | COLOR 7 |||||| |
| 19 | |||||| |
| 20 | PARITY P |||||| |
| 23 | |||||| |

Fig. 8

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | PARITY Q |||||| |
| 3 | |||||| |
| 4 | CHANNEL || COLOR 0 |||| |
| 5 | CHANNEL || COLOR 1 |||| |
| 6 | 0 | ROW ||||| |
| 7 | COLUMN |||||| |
| 8 | FONT |||||| |
| 19 | |||||| |
| 20 | PARITY P |||||| |
| 23 | |||||| |

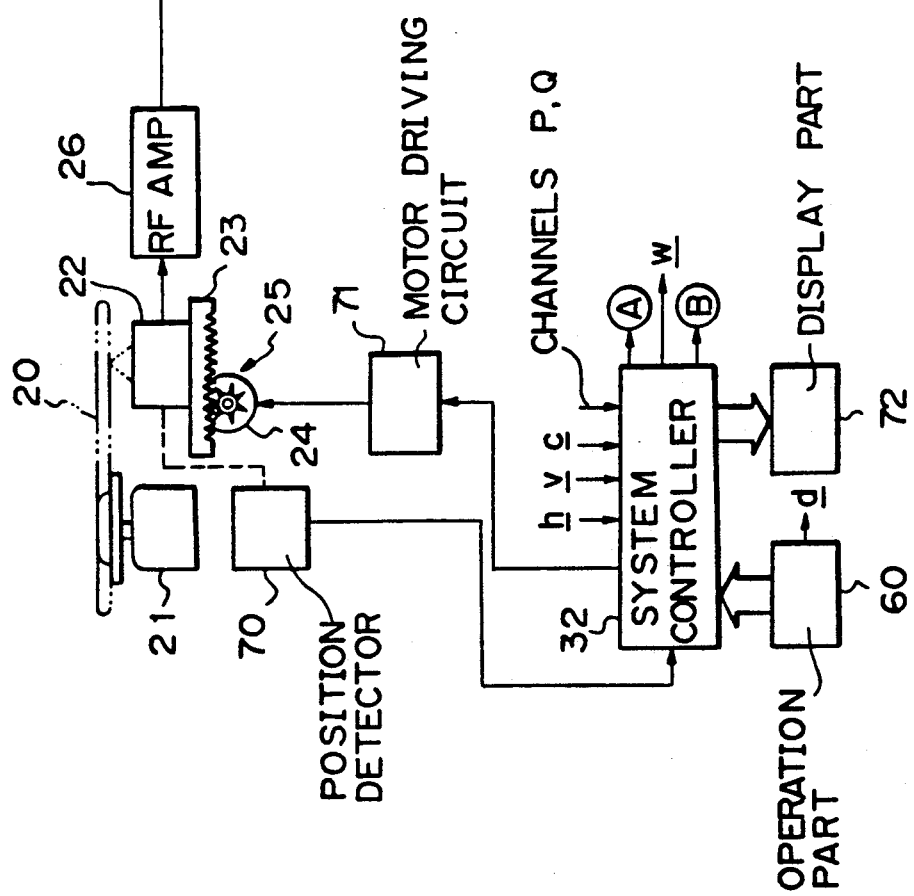

Fig. 16

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 0 | EXTENDED LINE-GRAPHICS MODE |
| 0 0 1 | 0 1 1 | EXTENDED TV-GRAPHICS MODE |
| 1 1 1 | 0 0 0 | USER'S MODE |

Fig. 17

| SYMBOL | R | S | T | U | V | W |
|---|---|---|---|---|---|---|
| 0 | 0 | 0 | 1 | 0 | 1 | 0 |
| 1 | 0 | 0 | 0 | 0 | 0 | 0 |
| 2 | \multicolumn{6}{c}{PARITY Q} |
| 3 | | | | | | |
| 4 | 0 | 0 | $b_3$ | $b_2$ | $b_1$ | $b_0$ |
| 5 | 0 | 0 | $b_7$ | $b_6$ | $b_5$ | $b_4$ |
| 6 | 0 | 0 | 0 | 0 | 0 | 0 |
| ⋮ | | | ⋮ | | | |
| 19 | 0 | 0 | 0 | 0 | 0 | 0 |
| 20 | \multicolumn{6}{c}{PARITY P} |
| ⋮ | | | | | | |
| 23 | | | | | | |

Fig. 18

| SYMBOL | R | S | T | U | V | W |
|---|---|---|---|---|---|---|
| 0 | 0 | 0 | 1 | 0 | 1 | 0 |
| 1 | 0 | 0 | 0 | 1 | 0 | 0 |
| 2 | \multicolumn{6}{c}{PARITY Q} |
| 3 | | | | | | |
| 4 | 0 | 0 | $T_0$ | \multicolumn{3}{l}{COLOR 0} |
| 5 | 0 | 0 | $T_1$ | \multicolumn{3}{l}{COLOR 1} |
| 6 | 0 | 0 | 0 | 0 | \multicolumn{2}{l}{ROW} |
| 7 | \multicolumn{6}{c}{COLUMN} |
| 8 | \multicolumn{6}{c}{FONT} |
| ⋮ | | | | | | |
| 19 | | | | | | |
| 20 | \multicolumn{6}{c}{PARITY P} |
| ⋮ | | | | | | |
| 23 | | | | | | |

Fig. 19

| Symbol | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | \multicolumn{6}{c}{PARITY Q} | | | | | |
| 3 | | | | | | |
| 4 | 0 | 0 | $b_3$ | $b_2$ | $b_1$ | $b_0$ |
| 5 | 0 | 0 | $b_7$ | $b_6$ | $b_5$ | $b_4$ |
| 6 | 0 | 0 | $b_{11}$ | $b_{10}$ | $b_9$ | $b_8$ |
| 7 | 0 | 0 | $b_{15}$ | $b_{14}$ | $b_{13}$ | $b_{12}$ |
| 8 | 0 | 0 | 0 | 0 | 0 | 0 |
| ⋮ | | | | | | |
| 19 | 0 | 0 | 0 | 0 | 0 | 0 |
| 20 | | | | | | |
| ⋮ | | | PARITY P | | | |
| 23 | | | | | | |

Fig. 20

| Symbol | R | S | T | U | V | W |
|---|---|---|---|---|---|---|
| 0 | 0 | 0 | 1 | 0 | 1 | 1 |
| 1 | 0 | 0 | 0 | 0 | 0 | 1 |
| 2 | | | PARITY Q | | | |
| 3 | | | | | | |
| 4 | T | 0 | COLOR | | | |
| 5 | 0 | 0 | REPEAT | | | |
| 6 | 0 | 0 | 0 | 0 | 0 | 0 |
| ⋮ | | | | | | |
| 19 | 0 | 0 | 0 | 0 | 0 | 0 |
| 20 | | | | | | |
| ⋮ | | | PARITY P | | | |
| 23 | | | | | | |

METHOD OF RECORDING AND REPRODUCING PICTURE INFORMATION, RECORDING MEDIUM, AND RECORDING MEDIUM PLAYING APPARATUS

BACKGROUND OF THE INVENTION

1. Field of the Invention

The present invention relates to a method of recording and reproducing picture information on and from a recording medium such as a video disc, a digital audio disc, and so on, and a recording medium, and also relates to a recording medium playing apparatus.

2. Description of Background Information

In recording and reproducing contents of a movie source (or film source, in other words) on and from a recording medium such as a video disc, it is general to originally superimpose characters such as the translation of dialogues on the picture. Since the characters obtained by this conventional method are always displayed without regard to the user's will, such a display can be annoying for viewers in some occasions. Also, there have been a problem that it is necessary to prepare a master disc separately for each of different languages.

Accordingly, it is conceivable to adopt a method in which characters are coded by means of the so-called closed caption system and the coded signal is inserted in portions of a video format signal containing the information obtained from the movie (film) source which do not appear on the display screen, such as the fly-back time portions, and in reproduction, the characters are reproduced by means of a decoder prepared for that purpose. With this method, the display of characters can be enabled at need by an on-off control of the decoder of that purpose.

However, since the amount of data which can be inserted is relatively small in the closed caption method, and it is possible to display superimposed characters only in one language. Therefore, there still remains the problem that master discs must be prepared respectively for each language.

On the other hand, a system is proposed in which picture information is recorded and reproduced in the form of the subcode on and from a digital audio disc. The subcode is made up of eight subcode bits, and bit groups forming the subcode are divided into eight channels denoted respectively by letters P, Q, R, S, T, U, V, and W. In the method in which the picture information is recorded and reproduced in the form of subcode, data corresponding to picture information is configured such that a symbol is formed by 6 bits of channels R through W out of the 8 bits forming the subcode, and 98 symbols are treated as one block, as illustrated in FIG. 1. Two symbols in the 98 symbols are used as a sync signal, and 24 symbols obtained by dividing the remaining 96 symbols, by four are treated as a minimum unit of data, i.e. a "pack", which constitutes one instruction of picture processing.

More specifically, the first symbol (referred to as symbol 0 hereinafter) of the 24 symbols shows one of several modes. A symbol 1 following this symbol 0 forms instruction which indicates the sort of the instruction. Symbols 2 and 3 following the symbol 1 constitute a parity Q which is an error correction code. Symbols 4 through 19 following the parity Q constitute a data field, and include information such as color information. Finally, symbols 20 through 23 following the data field constitute a parity P which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, the original image is to be maintained, and all data in the "pack" are 0 for this mode.

The "line-graphics mode" is provided for such a case that a liquid crystal display is provided on the front face of the player, to display notes such as an explanation of a music selection. As shown in FIG. 2, a picture area being long sideways is formed by pixels which are arranged in 288 columns and 24 rows. In other words, each row includes 288 pixels and each column includes 24 pixels. The term "pixel" stands for the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, in line of "fonts" is added to the upper and lower outer peripheries and the right and left peripheries of the Screen area, to form a picture area having 50 "fonts" in the direction of row, and 4 "fonts" in the direction of column. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper end and lower peripheries as well as the right and left outer peripheries of the "screen area".

As instructions for the picture processing, there are an instruction for painting out the whole picture area by one certain color, an instruction for drawing a picture in one "font" on the screen by using two different colors, an instruction for moving the whole picture upward or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P form data including information relating to a pause between two music selections.

In the above-described system of recording and reproducing picture information as subcode, the time period necessary for displaying a picture of one "font" is about 3.3/1000 second, and about 2.5 seconds are necessary for displaying 48×16 characters. This means that data corresponding to 48×16 characters can be recorded in a track section which the pickup traces for 2.5 seconds, and such a recording capacity is sufficient for recording dialogues translated in several languages. However, with conventional recording and reproducing methods using the subcode explained so far, the picture obtained from the subcode such as characters is displayed using the whole area of the screen. Therefore it was not possible to view the picture obtained from the subcode such as characters, simultaneously with the picture obtained from the video format signal containing information obtained from a source such as a movie film, by superimposing the picture obtained from the subcode as a superimposed dialogue.

OBJECT AND SUMMARY OF THE INVENTION

The present invention is based on the point described above, and an object of the present invention is to provide a method of recording and reproducing picture information by which a large amount of data including picture information such as characters can be recorded together with other information, and the recorded picture information can be selectively displayed in an area of a part of the picture formed by the video format signal.

Another object of the present invention is to provide a recording medium on which picture information is recorded according to the method of the invention, and an apparatus for playing such a recording medium.

A method of recording and reproducing picture information according to the present invention is characterized by the steps of recording graphic codes including picture information and instruction codes indicative of a mixing ratio at each position on a two-dimensional picture formed by the video format signal as the subcode of coded information signal, and at the time of reproduction, mixing signals according to the graphic codes at each position of the video format signal according to the contents of the instruction codes.

BRIEF DESCRIPTION OF THE DRAWINGS

FIG. 4 is a diagram showing the sort of recording modes in the method according to the present invention;

FIG. 5 is a diagram showing the construction of "load transparency control table";

FIG. 6 is a diagram showing the correspondency between the bit pattern of TCB and the mixing ratio;

FIG. 7 is a diagram showing "load color look-up table color 0 through color 7" instruction;

FIG. 8 is a diagram showing the construction of "write font foreground/background" instruction;

FIGS. 11A through 11C, when combined, are a block diagram showing an apparatus for reproducing picture information recorded on a disc in accordance with recording and playback method according to the present invention;

FIG. 11 is a diagram showing the arrangement of FIGS. 11A through 11C;

FIG. 16 is a diagram showing recording mode in another embodiment of the present invention;

FIG. 17 is a diagram showing the construction of "set TCW" instruction;

FIG. 18 is a diagram showing the construction of "write font" instruction;

FIG. 19 is a diagram showing the construction of "set TCW" instruction; and

FIG. 20 is a diagram showing the construction of "pre-set memory" instruction.

DETAILED DESCRIPTION OF PREFERRED EMBODIMENTS

Figure 1:
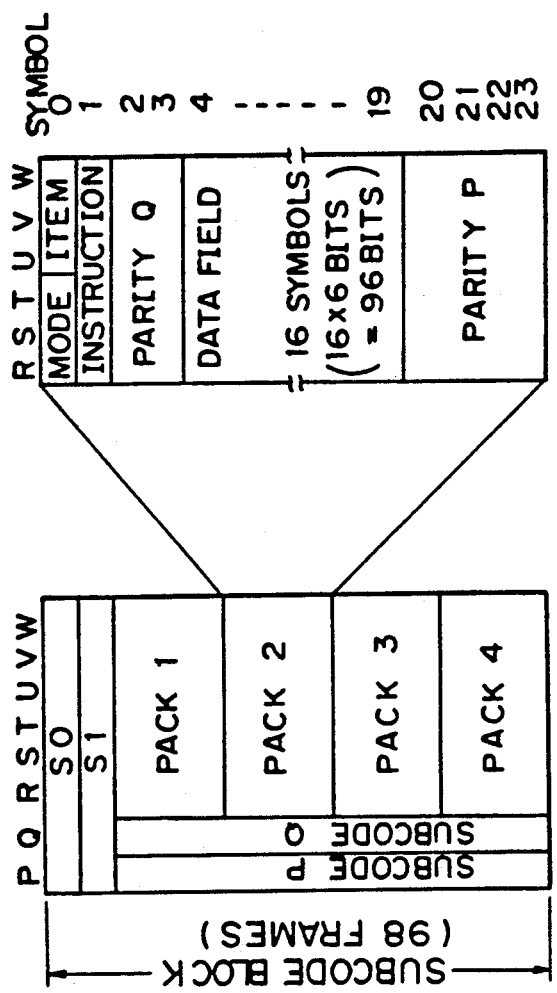
FIG. 1 is a diagram showing the recording format of subcode data.
Figure 2:
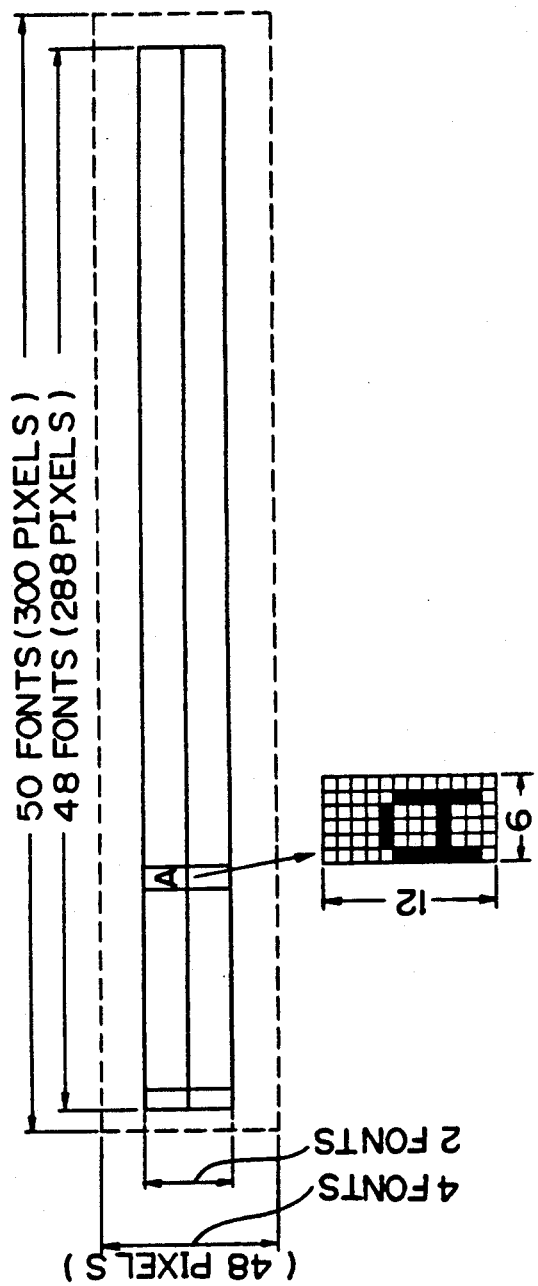
FIG. 2 is a diagram showing the structure of picture in the "line-graphics mode"
Figure 3:
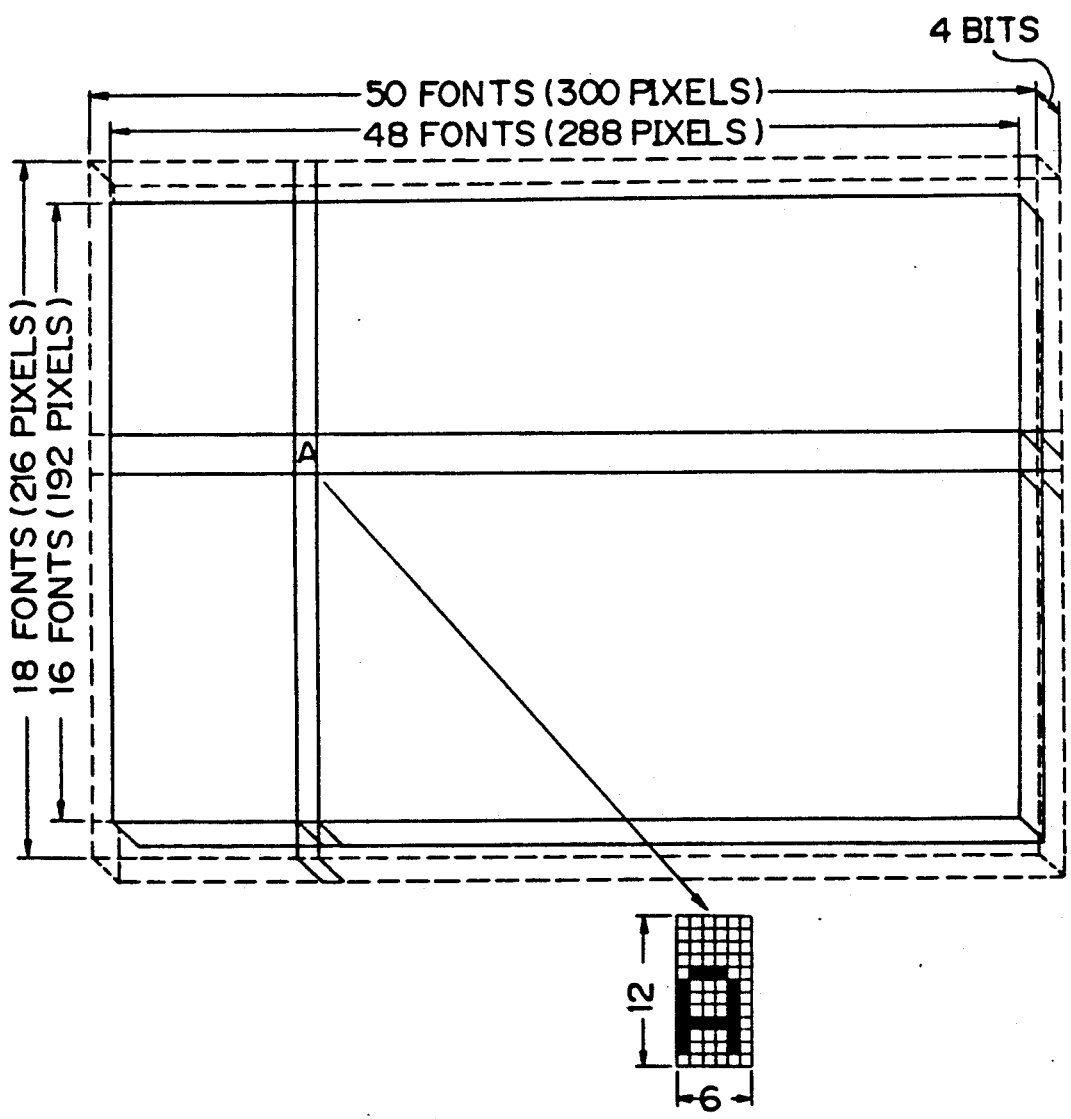
FIG. 3 is a diagram showing the structure of picture in the "TV-graphics mode"

An embodiment of the method according to the present invention will be explained with reference to FIGS. 4 through 19 of the accompanying drawings.

As shown in FIG. 4, a code to be inserted as the symbol 0 is set in order to designate an additional mode, that is, "graphic mode with motion picture" in addition to the "zero mode" the "line-graphics mode", the "TV-graphics mode" and the "user's mode" which are also used in conventional methods.

The structure of picture in the "graphics mode with motion picture" is identical with that in the "TV-graphics mode", and an instruction designated as "load transparency control table" is provided. This "load transparency control table" instruction is an instruction for designating the mode for each pixel in picture area. Three modes are designated by this instruction, and those are namely, "transparent mode", "mixing mode", and "non-transparent mode". In these three modes, different values are selected for the mixing ratio between a video format signal obtained by the subcode and a video format signal which is recorded by multiplexing together with the coded information signal including the subcode.

The bits in the channels R through W of each of the symbols 4 through 8 and the channels R and S of the symbol 9 constitute a series of codes TCB-0 through TCB-15 which respectively designate one of modes which will be described later for each of the group of pixels to which one of colors, which are registered as color number "0" through color number "15", is allotted. FIG. 6 shows a relationship between bit pattens of the codes TCB-0 through TCB-15 and the modes designating the mixing ratio, and the mixing ratio in each mode.

In addition, the sixteen colors indicated by the color number "0" through "15" are set by a "load CLUT color 0 through color 15 (load color look-up table color 0 through color 15)" instruction. The "load CLUT color 0 through color 15" instruction is an instruction having a structure illustrated in FIG. 7, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With this circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "31". The mixing of colors for each of the color number is as follows. Red color is represented by four bits of the channels R through U of even symbols allotted to the color number. Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4$ (=16) sorts of gray scales are available for each color, and preparation of $16^3$ (=4096) colors is possible since three colors (RGB) are used. In addition, a gray scale "0000" corresponds to the darkest state, and a gray scale "1111" corresponds to the brighest state.

On the other hand, a "write font foreground/background" instruction is used in the "TV-graphics mode", which has such a structure as illustrated in FIG. 8. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, subpicture channels can be designated by using four bits of the channels R and S of the symbols 4 and 5. By this feature, as many as sixteen picture channels can be designated. Sixteen sorts of picture are previously recorded on a disc for example, and on the playing side, a desired picture channel can be selected at the time of playing by this scheme of designating the picture channel.

Figure 9:
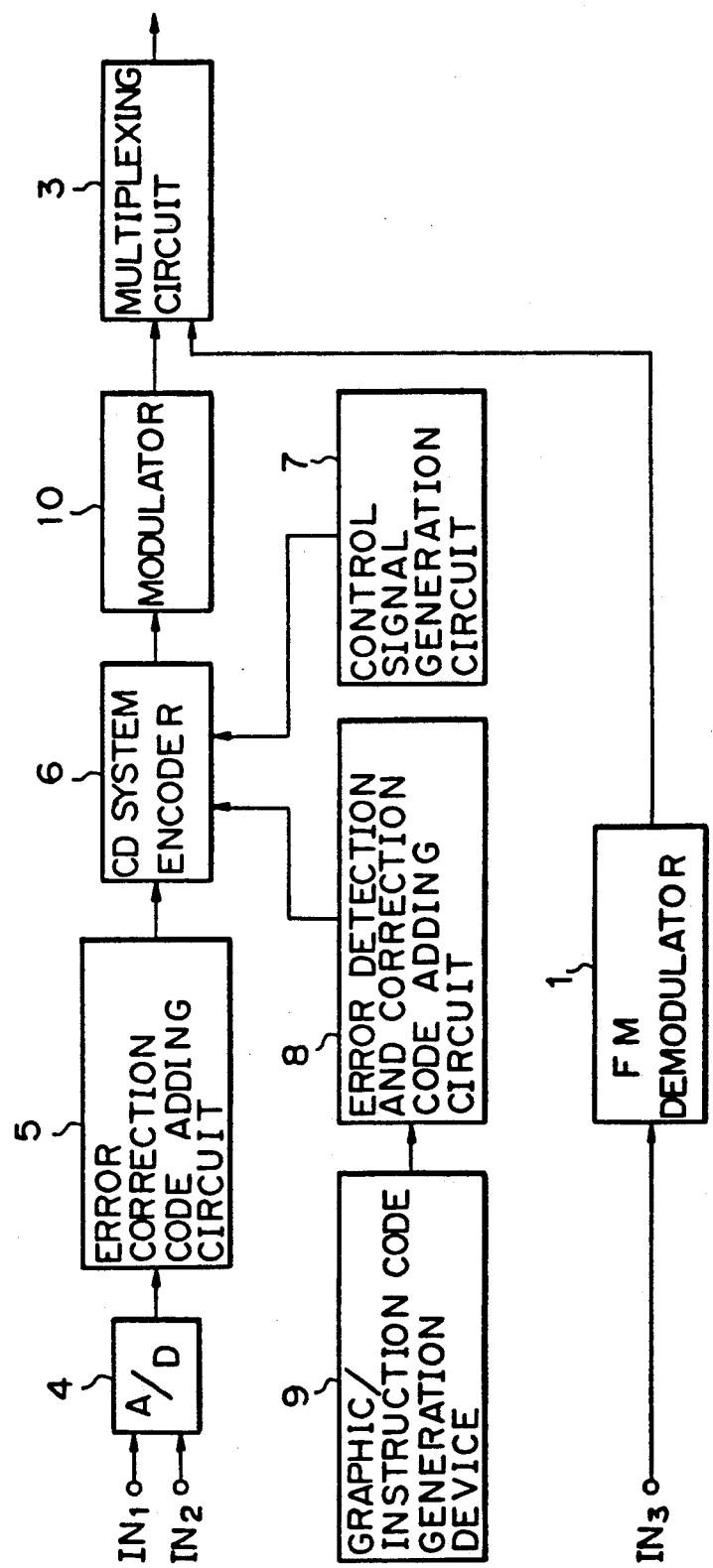
FIG. 9 is a block diagram showing an example of the construction of recording apparatus.

FIG. 9 shows an apparatus for recording the above explained codes on a recording disc by inserting the codes in the subcode.

In the arrangement shown in FIG. 9, two-channel audio signals and a video format signal outputted from a video tape recorder for example, are respectively supplied to input terminals $IN_1$, $IN_2$, and $IN_3$. The video format signal is supplied to an FM modulator 1. In the FM modulator 1, a carrier signal of a predetermined frequency is FM-modulated by the video format signal. An FM signal outputted by this FM modulator 1 is supplied to a multiplexing circuit 3. On the other hand, left and right-channel audio signals are supplied to an analog-to-digital converting circuit 4. The analog-to-digital converting circuit 4 is configured to perform the sampling of each of the left and right-channel audio signals at a sampling frequency of 44.1 MHz for example, to generate two digital data corresponding to two sampled values obtained by the sampling, and to output the digital data after treating them by time division multiplexing. The output data of this A/D converter 4 is supplied to a CD system encoder 6 through an error correction code adding circuit 5 which performs the interleave of the data, the error detection, and addition of codes for the error correction. To the CD system encoder 7, an output singal of the control signal generating circuit 7 and an output signal of the error detection and correction code adding circuit 8 are supplied. The control signal generating circuit 7 is configured to generate data such as a data indicating the time elapsed after the start of the supply of audio signals to the input terminals $IN_2$ and $IN_3$, and a data indicating a pause between music selections or a portion within one music selection of the audio signals.

On the other hand, output data of the graphic/instruction code generation device 9 is supplied to the error correction and correction code adding circuit 8. The graphic/instruction code generation device is configured to record a plurality of codes which are previously inputted by key operations for example, and to read-out and output desired codes. The error detection and correction code adding circuit 8 is configured to perform the interleave and error detection of the output data of the graphic/instruction code generation device 9 and the addition of the correction code.

The CD system encoder 6 is configured to form a recording signal by making the output of the control signal generation circuit 7 data of the channels Q and P, and making the output of the graphic code generating device through the error detection and correction code adding circuit 8 data of the channels R through W, and inserting those data into the digital data from the A/D converter 4. Output signal of this CD system encoder 6 is supplied to a modulator 10 and converted to an EFM (Eight to Fourteen Modulation) modulation signal. The output signal of this modulator 10 is supplied to the multiplexing circuit 3, and processed by a frequency multiplexing with the FM-modulated video format signal.

The output signal of the multiplexing circuit is supplied to an optical disc recorder of known arrangement (not shown) in which the strength of a light beam irradiated on the recording surface of a disc rotated at a constant linear velocity for example, is modulated by this signal. As a result, the graphic codes including picture information and the instruction codes are recorded on the recording disc as the subcode of the digital audio signal, in addition to the video format signal and the digital audio signal as the coded information signal.

Figure 10:
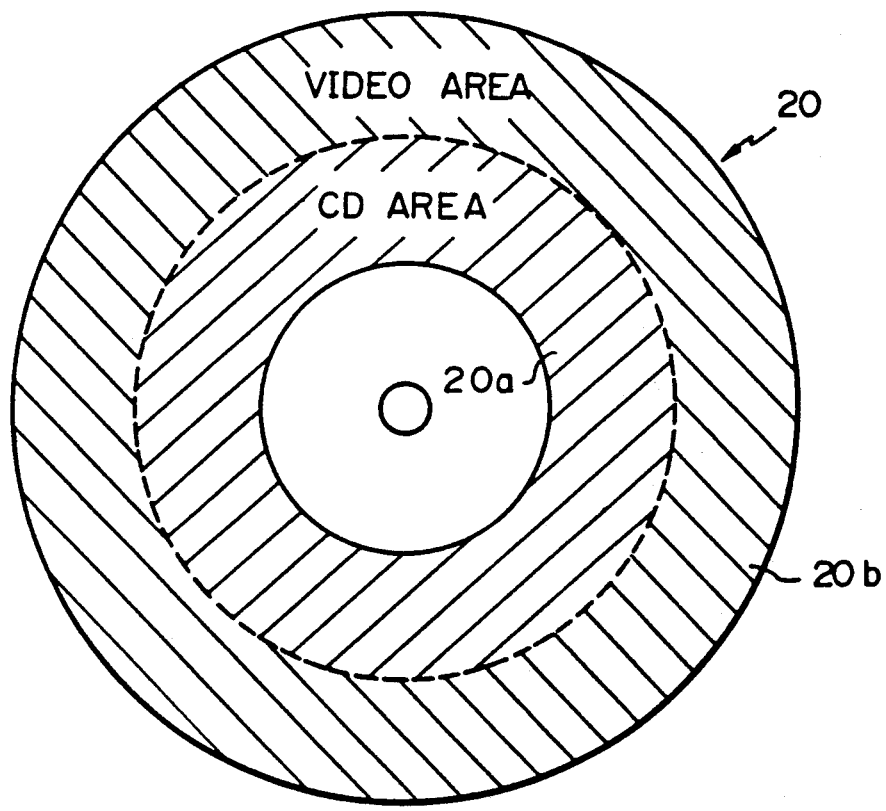
FIG. 10 is a diagram showing recording area of a composite disc.

FIG. 10 shows a composite disc 20 carrying a digital audio signal functioning as the coded information signal into which the subcode including picture information is inserted as explained above. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including picture information being inserted, wherein the superimposition is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, in the playing time, to reproduce the signal by rotating the disc at the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups formed correspondingly to each area by the repetition of index codes which respectively indicate start and end times of small portions which together constitute each area. In addition, the index codes of the audio lead-in area include information showing whether the disc itself is a composite disc or a disc of other type.

Figure 11B:
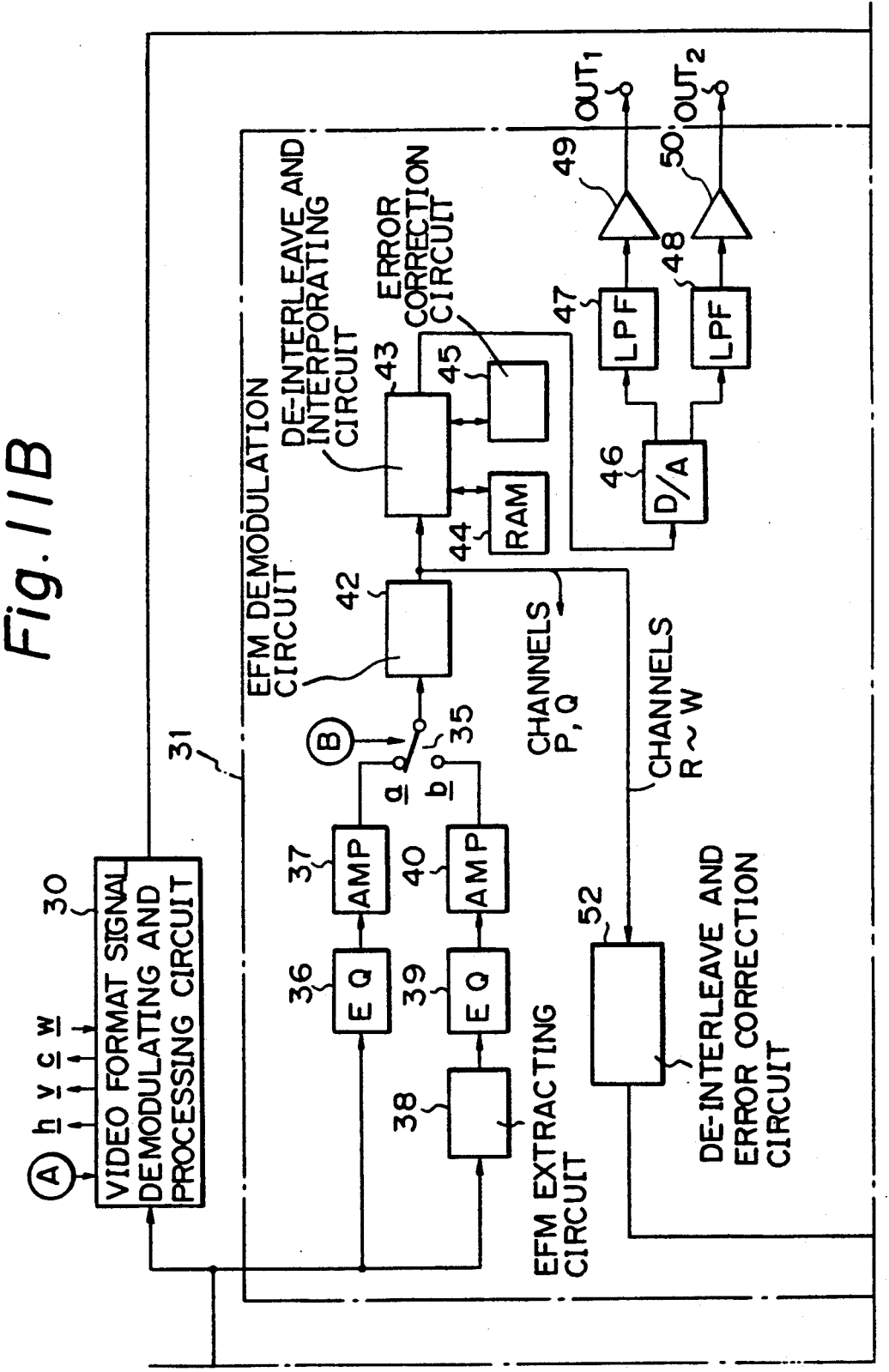
Figure 11C:
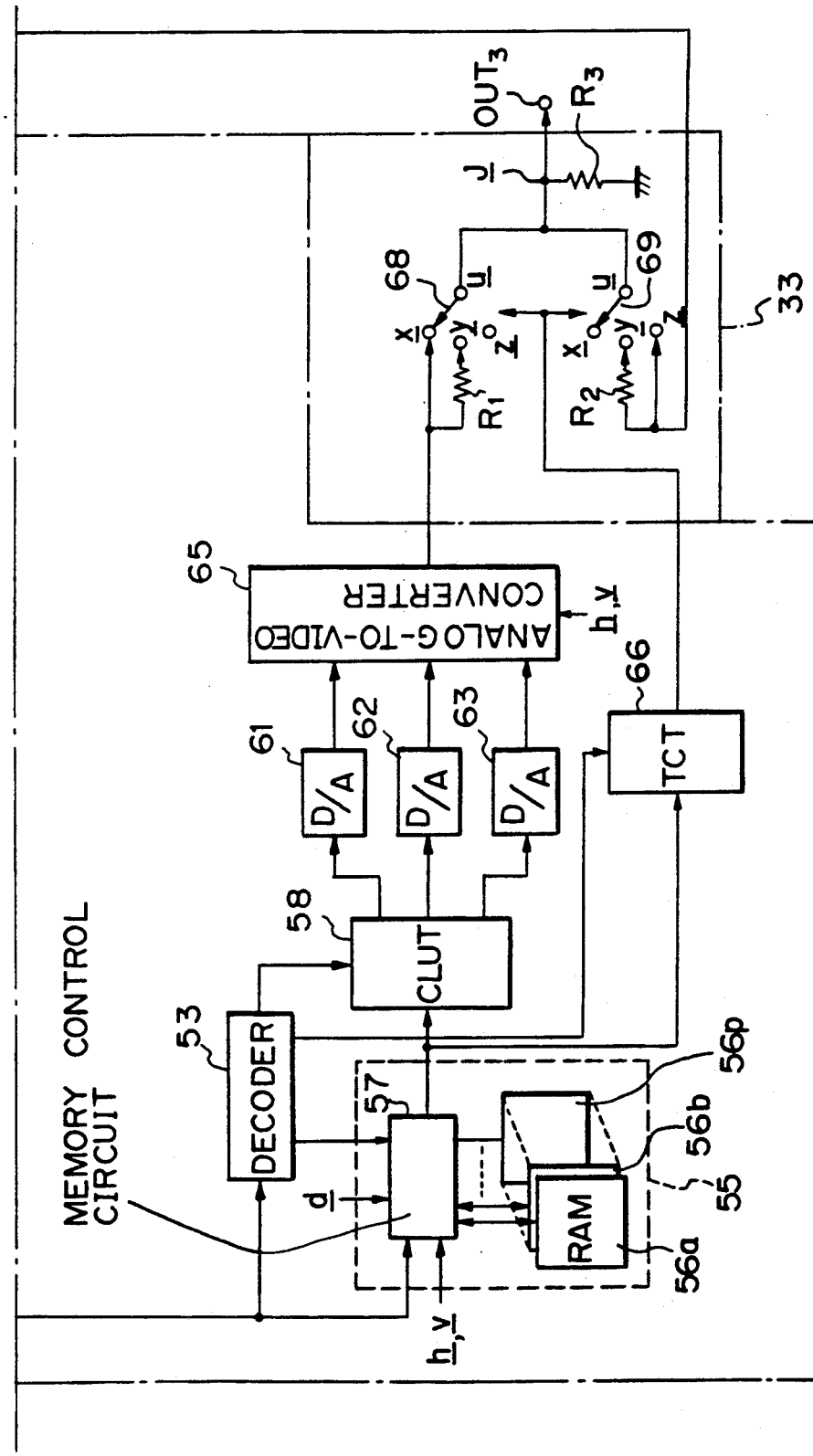
Figure 12:
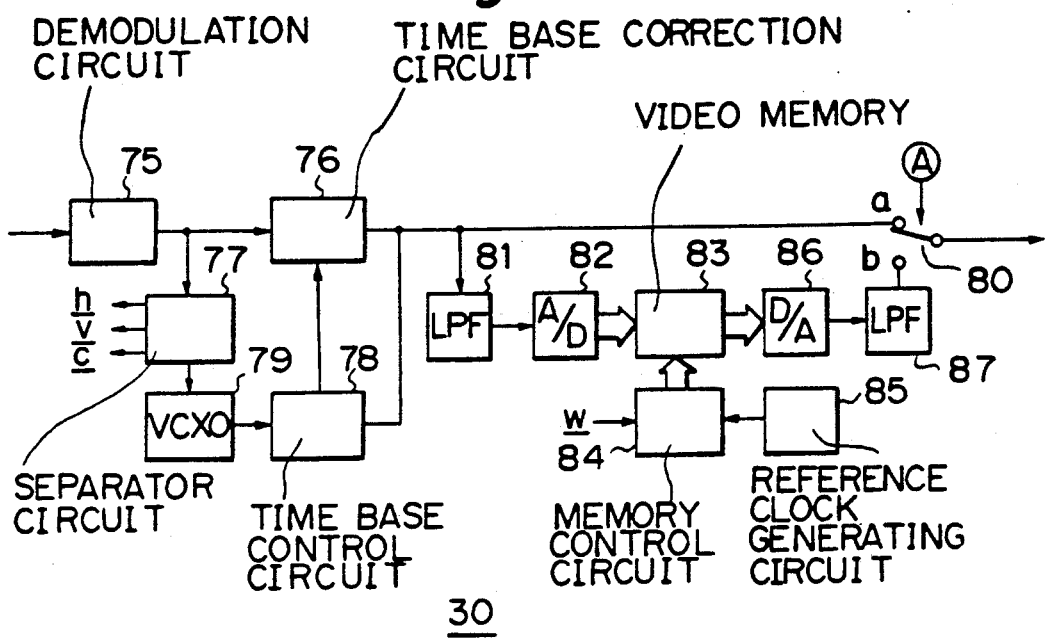
FIG. 12 is a block diagram showing a specific configuration of video format signal processing circuit 30 in the apparatus shown in FIGS. 11A through 11C.

FIGS. 11A through 11C show a disc player for playing a composite disc which has been explained above. As illustrated in these figures, a disc 20 is rotated by a spindle motor 21, and information recorded thereon is read-out by means of a pickup 22. The pickup 22 incorporates therein an optical system, including a laser diode, and objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is movable in the direction of disc radius by a direct drive of a transmission mechanism 25 which in turn has a slider motor 24 as a source of driving force, and made by a combination of rack and pinion gears. A read-out RF (radio frequency) signal outputted by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and configured to selectively output one of the video format signal outputted by the demodulation circuit and the video format signal read-out from the memory in accordance with a changeover command from a system controller 32. The video format singal outputted by the video format signal demodulating and processing circuit 30 is supplied to a video switch 33. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is provided with a selector switch 35 which changes its switch position in accordance with the area to be played (the CD area or the video area) during the playing of a composite disc. The selector switch 35 is operated to a position a during the playing of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequeancy characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as the EFM signal obtained during CD area playback.

During playback of a CD disc, the selector switch 35 is held in position a.

The playback EFM signal selected by the selector switch 35 is supplied to an EFM demodulation circuit 42 which performs the demodulation process, to obtain a PCM daata that is digital data including audio information of left and right channels which is for example time-division multiplexed, and the subcode. The digital data including audio information outputted by this EFM demodulation circuit 42 is supplied to a de-interleave and interpolating circuit 43. The de-interleave and interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inabilty signal is outputted. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filter) 47 and 48, the reproduced left and right-channel audio signals are supplied to audio output terminals $OUT_1$ and $OUT_2$ through amplifiers 49 and 50.

On the other hand, in the subcode outputted by the EFM demodulating circuit 42, two bits of the channels P and Q are supplied to the system controller 32, and six bits of the channels R through W are supplied to a de-interleave and error correction circuit 52 in which the de-interleave of the six bits of the channels R through W and the error correction using the parity Q and P are performed. Output data of the de-interleave and error correction circuit 52 is supplied to a mode/instruction decoder 53. The mode/instruction decoder 53 is configured to decode the mode represented by the three bits of the channels R through T of the symbol O of each pack, the mode designated by the item represented by the three bits of the channels U through W of the symbol O of each pack, and the instruction represented by the six bits of the channels R through W of the symbol 1 of each pack, and to supply to each part signals respectively indicative of the modes and the instruction.

Furthermore, the output data of the de-interleave and error correction circuit 52 is supplied to a picture memory device 55. The picture memory device 55 includes sixteen RAMs 56a through 56p having addresses respectively corresponding to all pixels on a picture having 50 "fonts" by 18 "fonts" in the row and column directions, and four bits of data can be stored in each address, and a memory control circuit 57 for sensing data indicating the color number of each pixel of each picture channels in the output data of the de-interleave and error correction circuit 52 by using the kind of the modes and the instruction indicated by the output of the mode/instruvtion decoder 53 and writing them in the corresponding addresses of the RAMs 56a through 56p, and for reading out sequentially in a predetermined order one memory content of the RAMs 56a through 56p corresponding to the picture channel designated by a data d by the key operation in an operation part 60 in accordance with horizontal and vertical sync signals h and v.

The data outputted by the picture memory device 55 is supplied to a color look-up table 58 (this table being referred to hereinafter as the CLUT). The CLUT 58 is configured to detect the "load CLUT color O through color 7" instruction and the "load CLUT color 8 through color 15" instruction from the output data of the de-interleave and error correction circuit 52 in accordance with the kind of the modes and the instruction indicated by the output signal of the mode/instruction decoder 53, and hold the color data corresponding to each color number, and configured to select and output color data of the color number designated by the data read-out from the picture memeory 55.

The output data of this CLUT 58 is made up of three data respectively representing the level of one of the R, C, B color signals by using four bits. The three data outputted by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 65. The analog-to-video converting circuit 65 is configured, for example, to form a video signal of the NTSC system by the steps of obtaining a luminance signal and two color difference signals by the output signals of the D/A converting circuits 61 through 63, generating a color carrier signal by adding signals obtained by the parallel modulation of two color subcarrier signal having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and sent subsequently.

In addition, the output data of the de-interleave and the error correction circuit 52 are also supplied to a transparency control table 66 (this table being referred to hereinafter as the TCT). The TCT 66 is configured to detect a "load TCT" instruction in the output data of the de-interleave and error correction circuit 52 in accordance with the kind of the modes and instruction indicated by the output signal of the mode/instruction decoder 53, hold transparency control bits TCB-0 through TCB-15, and output by selecting one of the TCB-0 through TCB-15 being held, corresponding to a color number indicated by the data read-out from the picture memory device 55.

The output signal of the TCT 66 is supplied to a video switch 33 as a control signal. In addition to the output signal of the TCT 66, the video format signal obtained from the subcode and outputted by the analog-to-video converting circuit 65, and the video format signal outputted by the video format signal demodulating and processing circuit 30 are supplied to the video switch 33.

In the video switch 33, the video format signal obtained from the subcode is supplied to a stationary contact x of the changeover switch 68, and also supplied to its stationary contact y through a resistor $R_1$. No connection is made to a stationary contact z of the changeover switch 68. The changeover switch 68 is configured to selectively output one of the signals supplied to its stationary contacts x, y, z by moving its movable contact u to be in contact with one of the stationary contacts x, y, z in accordance with a control signal issued from the TCT 66. The video format signal outputted from the video format signal demodulating and processing circuit 30 is directly supplied to a stationary contact z of a changeover switch 69 and also supplied to its stationary contact y through a resistor $R_2$. No connection is made to a stationary contact x of the changeover switch 69. The changeover switch 69, like the changeover switch 68, is configured to move its movable contact u to be in contact with one of its stationary contacts x, y, z in accordance with the control signal. The movable contacts u, u of the changeover switches 68 and 69 are mutually connected. A resistor $R_3$ is connected between a common junction J of the movable contacts u, u and ground. A mixed signal of the video format signal obtained from the subcode and the video format signal outputted from the video format signal demodulating and processing circuit 30 is derived at the common junction J. When the movable contacts u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. When, on the other hand, the movable contacts z, z are in contact with the stationary contacts y, y, the mixing ratio is equal to M which is determined by the resistors $R_1$ and $R_2$, and the resistance of the resistors $R_1$ and $R_2$ are selected so that M has a value between 20% and 80%. The signal derived at the common junction J is supplied to a video output terminal $OUT_3$.

A position detector 70 is provided in the vicinity of the path of the movement of pickup 22 along the radial direction of disc, and serves to detect when the beam spot emitted from the pickup 22 has reached a position corresponding to the vicinity of the boundary between the CD are and the video area of a composite disc, to produce a detection signal. By the generation of this detection signal, a state that the pickup 22 has reached to the video area can be detected. The position detector 70 can have a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the P-channel and Q-channel bits in the subcode outputted from the EFM demodulation circuit 42, disc designation information from the control part 60 indicating whether the disc to be played is a compact disc or a composite disc, and mode designation information from the operation part 60, indicating whether the reproducing area is only the CD area or the video area, or both CD and video areas in the case of the playback of a composite disc.

In this system controller 32, the processor executes processing of the signals inputted in accordance with programs previously stored in the ROM, and performs the control operation of each part of the video format signal demodulating and processing circuit 30, the selector switch 35, a drive circuit (not shown) for driving the spindle motor 21, the driving circuit 71 for driving the slider motor, and the display part 72.

FIG. 11 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. The time base correction circuit 76 consists of, for example, a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and the color burst signal of the video signal transmitted through the time base correction circuit 76. For more specific configuration, reference is directed for example Japanese patent application laid-open number P56-102182.

The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 is configured to perform control operations for sequentially read-out data written in each address of the video memory 83 in accordance with a clock from a reference clock generating circuit 85, and for rewriting the contents of each address of the video memory 83 in response to a write enable signal w which is outputted from the system controlled 32. The data read-out from the video memory 83 is converter to an analog signal in a D/A (digital to analog) converter 86, and supplied through an LPF 87 as the other input to the selector switch 80. The selector switch 80 is normally held at a position a to selectively output the video format signal directly supplied from the time base correction circuit 76, and switched to a position b in response to a changeover command from the system controller 32, to selectively output the video format signal having been processed through the video memory 83.

Figure 13:
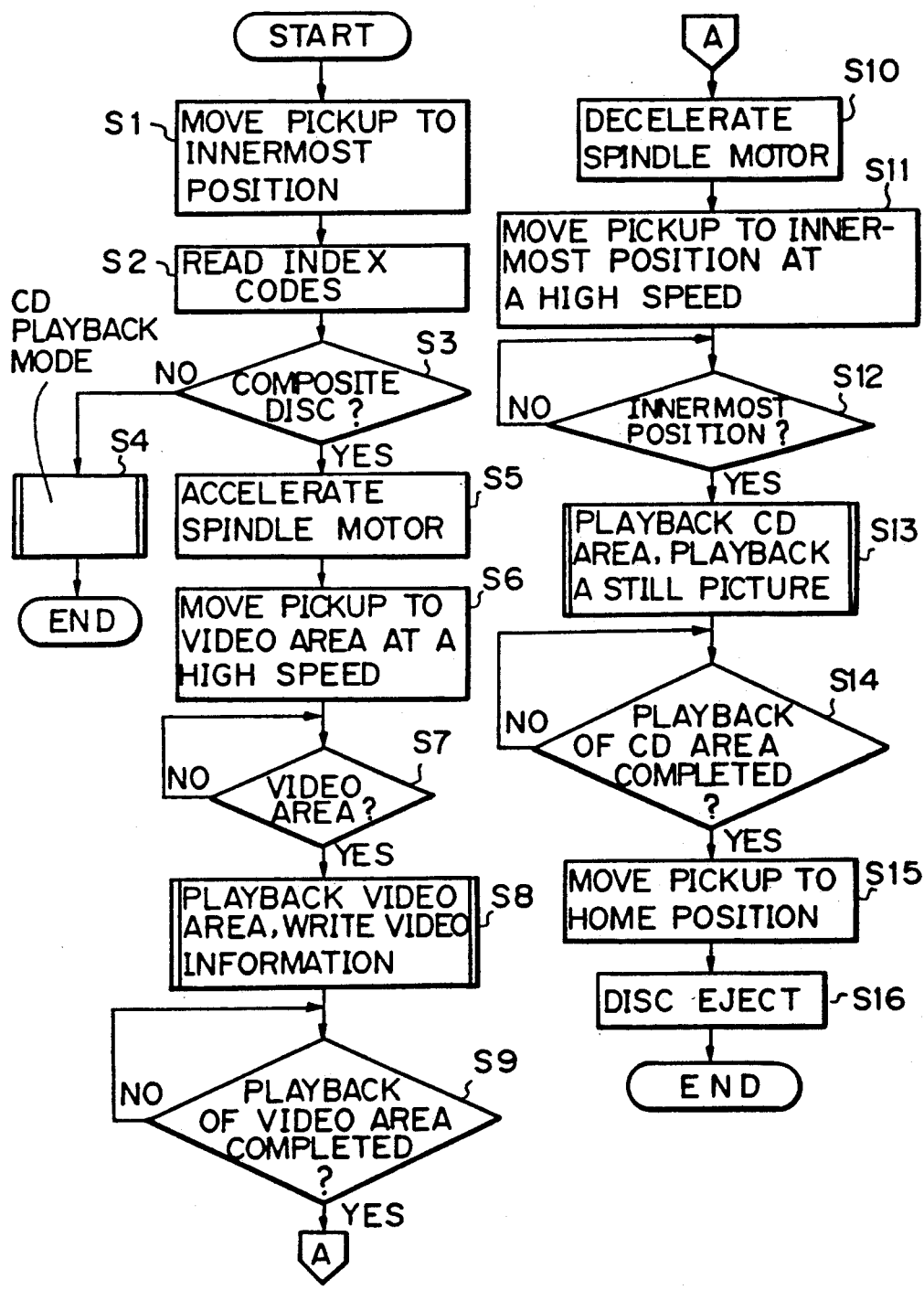
FIG. 13 is a flowchart showing the operation of processor in system controller 32 of the apparatus shown in FIGS. 11A through 11C.

Operations of the processor in the system controller 32 in the above configuration will be specifically explained with reference to the flowchart of FIG. 13.

Assume that a composite disc is set in a playback position. When a start command is issued in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and performs the read-in of index code information which is recorded in an audio lead-in area at an innermost peripheral area of the disc (step S2). Subsequently, the processor judges whether or not the disc being set is a composite disc or not, on the basis of the read information (step S3). If it is judged that the disc being set is a compact disc, then the execution directly proceeds to a CD playback mode (step S4) and a playback operation is continuously performed unless any command for the programmed music selecting operation for example has been issued. Since the playback operation in the CD playback mode itself is well known, the explanation thereof is omitted here.

If it is judged in the step S3 that the disc being set is a composite disc, the processor immediately accelerates the slider motor 21 to a maximum rated speed of rotation for the video area (step S5). At the same time, the processor moves the pickup 22 toward the outer periphery of disc at a high speed by driving the slider motor 24 at a high speed (step S6). After these operations, when it is detected that the pickup 22 has reached to the video area by the detection signal from the position detector 70 (step S7), the processor starts the playback operation of the video area (step S8). During video area playback, the processor performs the control operation for writing the video information of at least one field (or one frame) long obtained from the disc in the video memory 83. This video information to be written may be, for example, first information in the video area, or designated by and address designation through the key operation of the operation part 60.

If it is detected that the playback of the video area has been completed, in step S9, then the processor decelerates the spindle motor 21 to the maximum rated speed of rotation for the CD area (step S10). At the same time, the processor drives the slider motor 24 at a high speed, to move the pickup 22 to the innermost peripheral position of the disc at a high speed (step S11). If it is detected (step S12) that the pickup 22 has reached the innermost peripheral position by the detection output signal of the above mentioned detector switch (not illustrated), the processor starts playback operation of the CD area (step S13). Concurrently to this, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback. When the completion of the CD area playback is detected by reading the information of audio lead-out (step S14), the processor initiate the driving of the slider motor 24 to move the pickup 22 to its home position (step S15) unless any operational command is present. Furthermore, a loading mechanism (not shown in the drawings) performs disc ejection (step S16), to complete the playback operating sequence.

In the operating sequence described above, playback of the information recorded in the CD area of the composite disc is performed in steps S10 through S14 after the playback of information recorded in the video area in steps S1 through S9. When the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

Subsequently, by the decoding of the "write font foreground/background" instruction etc., picture data of 16 channels are in turn stored in the RAM 56a through 56p in the picture memory device 55. When one of the picture data of 16 channels is designated by data corresponding to the key operation in the operation part 60, picture data of the designated channel is sequentially outputted from the picture memory device 55, and in turn supplied to the CLUT 58. By this operation, color data of a color number indicated by the picture data is then outputted from the CLUT 58. A video format signal based on this color data is outputted from the analog video converting circuit 65, and supplied to the video switch 33.

Figure 14:
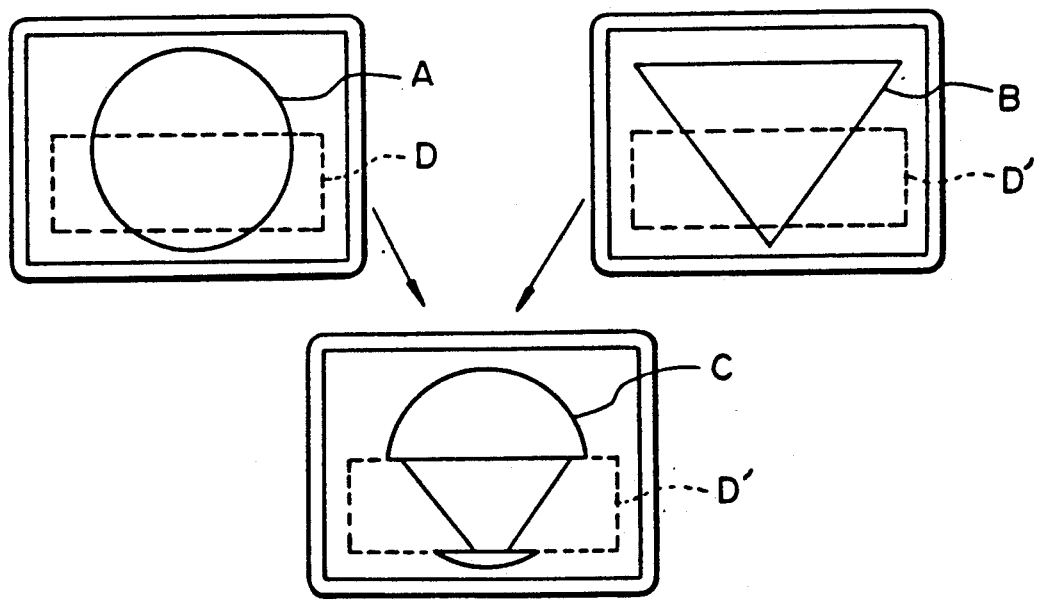
FIGS. 14 and 15A through 15C are diagrams showing pictures obtained by the apparatus shown in FIG. 11A through 11C.

If the "load TCT" instruction is decoded in this state, the transparency control bits TCB-0 through TCB-15 respectively corresponding to each color number are then held in the TCT 66. Among the TCB-0 through TCB-15 being held, one corresponding to the color number indicated by the data read-out from the picture memory device 55 is selectively outputted from the TCT 66, and the mixing ratio in the video switch 33 is designated by the output of the TCT 66. Thus, the mixing ratio between the video format signal outputted from the analog-to-video converting circuit 65 and the video format signal outputted from the video format signal demodulating and processing circuit 30 is controlled for each pixel. Consequently, a combination of pictures such as illustrated in FIG. 14 is made possible. Specifically, the mixing ratio is set to 100% for a portion corresponding to each pixel outside a region D of a picture A based on the video format signal outputted from the video format signal demodulating and processing circuit 30, and set to 0% for a portion corresponding to each pixel within the region D. On the other hand, the mixing ratio is set to 0% for a portion corresponding to each pixel outside a region D' of a picture B based on the video format signal outputted from the analog-to-video converting circuit 65, and set to 100% for a portion corresponding to each pixel within the region D' of the picture B. Then a picture C can be formed by combining the portion of the picture A outside the region D and the portion of the picture B within the region D'.

Figure 15A:
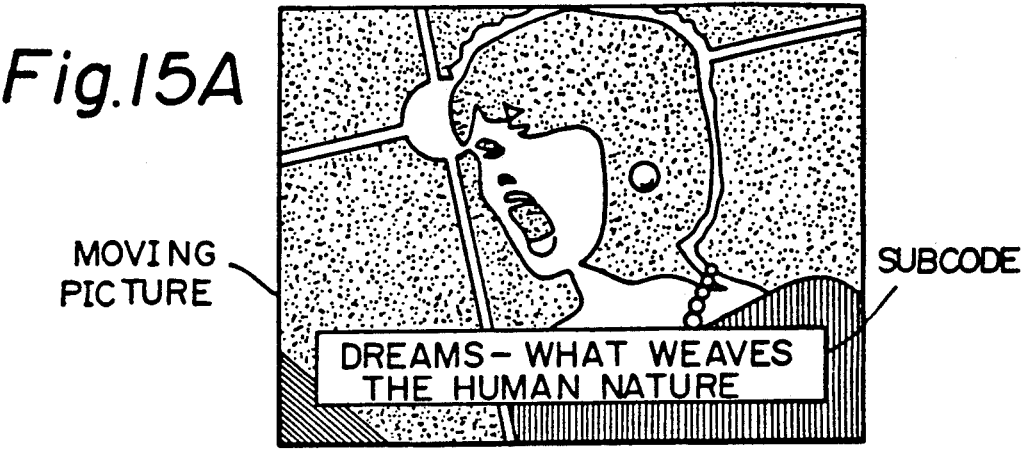
Figure 15B:
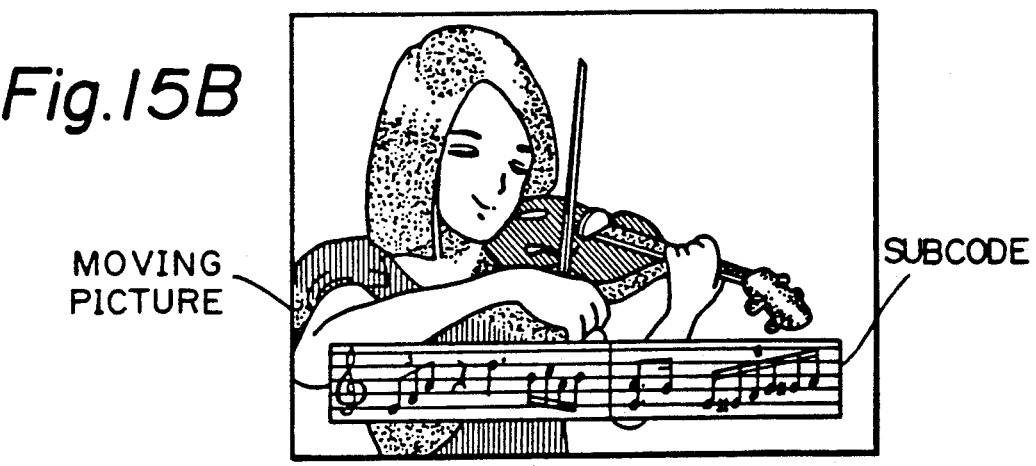
Figure 15C:
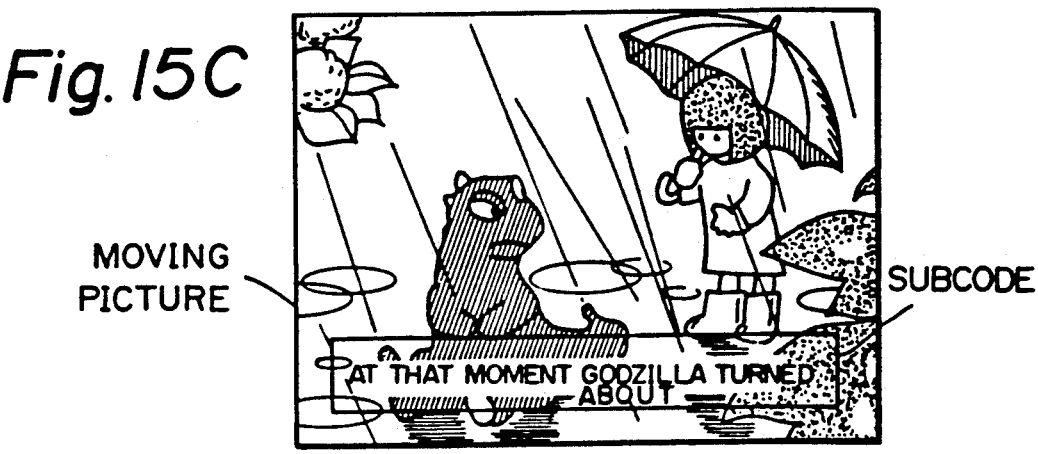

In this way, it is possible to compose a picture as illustrated in FIGS. 15A through 15C, in which a translation of a dialogue, a musical score, or an explanation of a scene, etc., obtained from the subcode is inserted into a moving picture obtained by the video format signal recorded in the video area.

Moreover, by inserting data corresponding to characters of a plurality of languages in each of the picture channel, it becomes possible to record captions (translations of dialogues) in a plurality of languages in a single disc, and to selectively display the caption (translation of dialogues) in a desired language in accordance with a key operation in the operation part 60. Thus, the preparation of a plurality of mother discs for different languages is no more required.

FIG. 15 is a diagram showing another embodiment of the present invention. In this embodiment, codes to be inserted as the symbol 0 are set for designating "extended ling-graphics mode" and "extended TV-graphics mode" in addition to the four modes of "zero mode", "line-graphics mode", "TV-graphics mode", and "user's mode" in the conventional system.

The composition of picture in the "extended line-graphics mode" is the same as in the "line-graphics mode", and an instruction designated by a "set TCW" (set Transparent Control Word) having a structure shown in FIG. 17, and an instruction designated as "write font" shown in FIG. 18 are provided. The "set TCW" instruction is such an instruction in which each of the bits $b_0$ through $b_7$ of TCW represented by 8 bits of the channels T through W of the symbols 4 and 5 corresponds to each of the color numbers indicative of the eight colors in the "line-graphics mode", and which sets the mixing ratio to either one of 0% and 100% for each of the groups of pixels to which the corresponding color number is designated respectively, by using the value of the bits $b_0$ through $b_7$. On the other hand, the "write font" instruction, like the "write font" instruction in the "line-graphics mode", is an instruction for writing the font data in the designated locations in the picture memory, and at the same time, setting the mixing ratio to either one of 0% and 100% for each of groups of the pixels to which two color numbers represented respectively by 3 bits of the channels U through W of the symbols 4 and 5 are designated, by means of the value of each of the bits $T_0$, $T_1$ of the channel T of the symbols 4 and 5.

The composition of picture in the "extended TV-graphics mode" is the same as in the "TV-graphics mode", and this mode is provided with the instruction designated as "set TCW" illustrated in FIG. 19, and an instruction designated as "pre-set memory" illustrated in FIG. 20. The "set TCW" instruction in the "extended TV-graphics mode" is such an instruction in which bits $b_0$ through $b_{15}$ of the TCW represented by 16 bits of the channels T through W of the symbols 4 through 7 respectively correspond to the color numbers indicating the 16 colors in the "TV-graphics mode", and which sets the mixing ratio to either one of 0% and 100% for each of groups of pixels to which corresponding color number is designated, by using the value of each of the bits $b_0$ through $b_{15}$. The "pre-set instruction" instruction, on the other hand, is an instruction for setting the mixing ratio to either one of 0% and 100% for each of groups of pixels to which colors of the color numbers represented by the four bits of the channels T through W of the symbol 4 are designated respectively, by using the value of the bit T of the channel R of the symbol 4.

The picture information recorded as the subcode using the recording format explained so far can be processed by making the configuration of the TCT 66 in the apparatus shown in FIGS. 11A through 11C such that data representing the mixing ratio is held correspondingly to each color number by means of the "set TCW" instruction, the "write font" instruction, and the "pre-set memory" instruction.

In the embodiment described above, the recording medium on which the subcode carrying picture information is recorded is a composite disc generally designated as CDV. However, it is of course possible to use, as the recording medium on which the subcode carrying the picture information is to be recorded, other type of recording medium such as a disc designated as LDD i.e. a disc on which an FM-modulated video format signal, an audio signal, and a digital audio signal are recorded by multiplexing, by using a frequency multiplexing system, and so on.

Furthermore, in the embodiment described above, the number of bits of the instruction codes indicating the mixing ratio in each position of two-dimensional picture formed by the video format signal, is described as 1 or 2. However, the number of bits of this instruction codes can be set to be any value as long as the number does not exceeds the bit number of the data field in one pack.

In the above described embodiment, new modes such as the "graphic mode with picture", "extended line-graphics mode", "extended TV-graphics mode", are provided, and the instructions for designating the mixing ratio in each pixel are provided only in these new modes. However, it is also possible to arrange such that the instructions for designating the mixing ratio in each pixel are added, for example, in the "TV-graphics mode", without providing any new mode. As the instruction to be added in the "TV-graphics mode", an instruction having such a construction as shown in FIG. 5, or an instruction like the instruction shown in FIG. 20 in which the mode of each pixel can be set to either one of the transparent mode and the non-transparent mode by the 16 bits of the channels T through W of the symbols 4 through 7, and the mode in each pixel can be set to a mixing mode by using 16 bits of the channels T through W of the symbols 8 through 11. In the case of the latter instruction, it is preferable to make valid only a part of the bits in the symbols 8 through 11, which correspond to the bit "1" among the bits in the symbols 4 through 7.

As explained in detail in the foregoing, the method of recording and reproducing picture information according to the present invention is configured such that graphic codes including picture information and instruction codes indicative of the mixing ratio at each position of a two-dimensional picture formed by a video format signal are inserted as subcode of a coded information signal and record on a recording medium, and in reproduction, a signal according to a graphic code is mixed at positions of the video format signal in accordance with the instruction codes. By this feature, it is possible to record large amount of data including picture information such as characters with other information, and to selectively display the recorded picture information in a region of a part of the picture formed by the video format signal.

What is claimed is:

1. A method of recording and reproducing picture information on a recording medium comprising the steps of:
    inserting graphic codes including picture information and instruction codes as a subcode of a coded information signal, wherein each of said instruction codes indicates a mixing ratio between a picture according to a video format signal and a picture according to said graphic codes at each position of a two-dimensional picture formed by said video format signal;
    recording said coded information signal on said recording medium; and
    mixing, at a time of reproduction from said recording medium, signals based on said graphic codes at each position of said video format signal in accordance with contents of said instruction codes.

2. A method as set forth in claim 1, wherein said graphic codes represent the color of each position of said two-dimensional picture, and said instruction codes respectively represent one of mixing ratios which are previously determined correspondingly to colors represented by said graphic codes.

3. The method claimed in claim 1, wherein said video format signal is recorded with said coded information signal on said recording medium in the recording step.

4. An apparatus for playing a picture information recording medium on which are recorded graphic codes including picture information and instruction codes, said codes being inserted as a subcode of a coded information signal, wherein each of said instruction codes indicates a mixing ratio between a picture according to a video format signal and a picture according to said picture information by said graphic codes at each position of a two-dimensional picture formed by said video format signal, said apparatus comprising:
    pickup means for reading signals recorded on said recording medium and generating a pickup output signal;
    coded information signal demodulating means for demodulating said coded information signal from said pickup output signal;
    graphic codes demodulating means for demodulating said graphic codes from an output signal of said coded information signal demodulating means;
    instruction codes demodulating means for demodulating said instruction codes from said output signal of said coded information signal demodulating means;

means for generating signals based on said graphic codes from an output signal of said graphic codes demodulating means; and mixing means for mixing said signals based on said graphic codes at each position of said video format signal in accordance with contents of said instruction codes.

5. An apparatus as set forth in claim 4, wherein said graphic codes represent the color of each position of said two-dimensional picture, and said instruction codes respectively represent one of mixing ratios which are previously determined correspondingly to colors represented by said graphic codes.

6. The apparatus as claimed in claim 4, wherein said video format signal is recorded on said picture information recording medium and the apparatus further comprises video format signal demodulating means for demodulating said video format signal from said pickup output signal.

* * * * *